United States Patent [19]

Grainger

[11] Patent Number: 5,758,832
[45] Date of Patent: Jun. 2, 1998

[54] GLASS RECYCLING SYSTEM

[75] Inventor: Walter T. Grainger, West Chester, Pa.

[73] Assignee: Grainger Associates, West Chester, Pa.

[21] Appl. No.: 795,874

[22] Filed: Feb. 6, 1997

[51] Int. Cl.$^6$ .................................................. B02C 19/12

[52] U.S. Cl. ..................... 241/19; 241/24.14; 241/24.15; 241/24.22; 241/29; 241/79.1; 241/80; 241/152.2

[58] Field of Search ........................... 241/76, 77, 78, 241/29, 19, 24.22, 24.3, 99, 79.1, 152.2, DIG. 38, 34, 35, 80, 97, 24.14, 24.15

[56] References Cited

U.S. PATENT DOCUMENTS

| | | | |
|---|---|---|---|
| 3,650,396 | 3/1972 | Gillespie et al. | 241/DIG. 38 |
| 4,728,045 | 3/1988 | Tomaszek | 241/99 |
| 4,795,103 | 1/1989 | Lech | 241/99 |
| 5,350,121 | 9/1994 | Vitunac et al. | 241/24.22 |
| 5,452,860 | 9/1995 | Williams | 241/152.2 |
| 5,484,109 | 1/1996 | Cook | 241/99 |
| 5,524,837 | 6/1996 | Raynes | 241/24.22 |

Primary Examiner—Mark Rosenbaum
Attorney, Agent, or Firm—Robert F. Zielinski

[57] ABSTRACT

An apparatus and method for recycling glass waste comprising glass and non-glass materials. The apparatus has a device for receiving and presizing the glass waste to produce presized glass waste. A first conveyor receives the presized glass waste and transfers it to a storage hopper. The presized glass waste is then transported to an impact mill via a second conveyor. The rate of movement of the second conveyor is regulated by a control device located within the impact mill. In the impact mill, the glass component of the glass waste is beat off the non-glass component of the glass waste to produce a pulverized mixture. The pulverized mixture is then sent to a screening device via a third conveyor. In the screening device, the glass and non-glass material are separated from the pulverized mixture and collected for reuse. The method includes the steps of providing a supply of glass waste, presizing the glass waste to produce presized glass waste, pulverizing the presized glass waste to produce a pulverized mixture comprising glass and non-glass material, separating those pieces of glass which are within a predetermined size from the pulverized mixture and separating those pieces of the non-glass material which are completely free of the glass from the pulverized mixture.

27 Claims, 4 Drawing Sheets

5,758,832

1

GLASS RECYCLING SYSTEM

FIELD OF THE INVENTION

This invention relates to recycling glass waste. In particular, the invention relates to an apparatus and method for recycling glass waste, and more specifically, laminated, wire, safety and/or security glass which effectively recovers the glass and non-glass materials for reuse.

BACKGROUND OF THE INVENTION

Interest in recycling waste and waste recycling activities continues to grow at unprecedented rates. In addition to the obvious conservation of resources recycling can actually save money. Today, landfill space is at a premium and, as a result, waste disposal fees have skyrocketed. Individuals, municipalities and manufacturers are all looking for ways to reduce the amount of materials of which they have to dispose. Reduced consumption is not usually a viable option; however, recycling is one way that this goal can be accomplished. Recycling is attractive because it can also be profitable where the recovered materials are resold and later reused.

Manufacturers are also looking to recycling in order to avoid hidden or unforeseeable costs which may arise. Specifically, it is not uncommon for a manufacturer to be fined or penalized by a local, state or federal government entity because a product which the manufacturer produced many years ago is found in a landfill and now considered a hazardous waste. In these instances, the manufacturer is held accountable, perhaps not because it actually dumped the waste, but merely because it originally produced the product. In view of this, many manufacturers are relying heavily on recycling in order to reduce their potential exposure to liability.

All of the above considerations are particularly applicable to automobile manufacturers. In fact, in the automobile industry, manufacturers are often required to account for the recyclability of virtually every component that goes into an automobile. This is particularly problematic with respect to the disposal of safety glass used in automobile windshields and windows.

Safety glass is usually laminated, i.e., formed from a sheet of clear plastic material sandwiched between two sheets of glass. The use of laminated glass has proven to be a significant advance over non-laminated glass. It's principal safety features are its improved strength and resistance to shattering. Safety glass is also used in banks, government buildings, factories, schools and office buildings. When safety glass is broken, the glass components stay adhered to the plastic material. While this strong adhesion property is a benefit when considering safety, it is a detriment when attempting to recycle laminated glass. The plastic material essentially adheres to the glass so effectively, that it is virtually impossible to separate the glass from the plastic material. Thus, it has not been a particularly attractive source for recycled materials.

There are many uses for recycled laminated glass. Since laminated glass is usually clear, it is purer than and much more valuable than colored glass. For example, the recovered glass can be reused to make new safety glass and other glass products. The recovered glass can also be used in the formulation of reflective paints. Additionally, there are commercial uses for the recycled plastic material which is separated from the glass.

Laminated glass has proven to be very difficult to recycle for a variety of reasons. For example, in addition to the difficulty in separating it into its component materials, it is often manufactured in large sections (i.e., 4'×6') or larger or in pieces (4" to 8" thick) which are cumbersome to handle. As a result, large sheets of glass are often disposed in a landfill without being reduced in size, thereby taking up valuable landfill space. This problem is exacerbated by the sheer volume of laminated glass which exists. Millions of pieces of laminated plate glass must be disposed of each year as automobiles are permanently "retired" and safety glass is disposed of in dump sites.

Due to the fact that the quantity of laminated glass is so high and that it is difficult to recycle, many waste sites now do not accept laminated safety glass. Thus, automobile salvage yards have, in essence, become storage sites for discarded laminated glass. Although the salvage yards make some effort to recycle the laminated glass, these efforts have been ineffective. Typically, for example, one widely used method involves shattering the safety glass with a sledgehammer and exposing the shattered glass to the sunlight and the environment. After a number of years, the ultraviolet rays of the sun may loosen the bond between some of the glass and some of the plastic material. This loosening effect allows for small amounts of the glass and plastic material to be recovered. However, the bond between a large percentage of the glass and plastic material remains relatively strong. Thus, a large portion of the laminated glass cannot be recycled. In addition, the actual recycling time period is too long because the laminated glass must be exposed for a number of years before it is ready to be recycled. Obviously, it would be preferable if the laminated glass could be completely recycled as soon as it becomes waste.

There are a number of United States patents which are directed to recycling glass. For example, U.S. Pat. No. 4,795,103 to Lech discloses a system for processing glass products such as bottles, plate glass and purportedly, laminated glass. Glass products are deposited into a hopper, through a vibrating chute and onto a conveyor belt. The conveyor moves the glass past a series of magnets which remove metallic objects and deposit the removed metal in a refuse bin. The glass is then pulverized in a pulverizing mill, and then subjected to a vacuum which collects dust and light particles, such as paper, plastic and the like, in a dust collection tank. The pulverized glass is then deposited on a vibrating screen to separate the uniformly sized particles. Oversized glass products do not pass through the screen but fall into a refuse chute which deposits the unwanted oversized particles into a refuse bin. The pulverized and screened glass is then transported past a second magnet which removes any final metallic particles.

U.S. Pat. No. 3,650,396 to Gillespie, et al., relates to a method and apparatus for separating multicolored glass and recovering glass of a particular color, such as flint glass, from a waste product. The waste product is pulverized and a glass portion is separated from a non-glass portion. The glass portion is then passed through a photometric sorting apparatus to separate the glass particles into a colored cullet fraction and a flint cullet fraction. Magnetic metals are then removed from the waste feed. The flint cullet fraction, which is worth considerably more than the colored cullet fraction, can be remelted and used for making clear bottles.

Similarly, U.S. Pat. No. 5,583,695 to Genestie also discloses a process and apparatus for purifying hollow glass for recycling and reuse. The necessity for manual sorting techniques is minimized due to the disclosed process of mechanical purification, in parallel, carried out on separate portions of the recovery glass. According to one aspect of the invention, the process includes the steps of: (1) separating raw glass materials into several sized portions; (2) selectively grinding each portion; and (3) separating, by screening, useful recoverable fractions. The process permits the progressive elimination of all types of impurities, such as stones and infusible materials, and the incorporation of a large percentage of recovery cullet—up to about 50% and more—into the glass melt.

There are other known prior art references which are related to recycling glass. These generally include processes and apparatuses for breaking the glass components of articles comprising glass and non-glass components and liberating the glass components from the non-glass components by subjecting the articles to controlled vibrations sufficient to break the glass without braking the non-glass components; methods for the separation of components of solid waste which has been treated by thermal explosive decompression followed by biodegradation; and methods for recovering glass from a mixture of glass and metal by thermally shocking the mixture by subjecting it to a rapid increase or decrease in temperature to induce cracks in and/or break up the glass particles.

Although the known art has alleviated some of the problems associated with recycling glass, they all have inherent limitations. Specifically, none of the references disclose an apparatus or a method for dealing specifically with the problems associated with laminated, wire, safety and/or security glass and none teaches or suggests effective recycling of such safety glass by separating and recovering the glass and plastic material. Moreover, none of the references teaches or suggests treating such glass which may be in large sections (4'×6') or in thick pieces (4"–8").

Thus, it will be appreciated that there is a need for an apparatus and method capable of effectively recycling laminated safety glass to effectively recover higher percentages of glass and plastic material.

There is also a need for an apparatus and method capable of effectively recycling laminated glass in an affordable and time-efficient manner.

There is also a need for an apparatus and method capable of effectively recycling other forms of plate glass to separate and recover higher percentages of glass and the non-glass materials embedded therein or attached thereto.

There is also a need for an apparatus and method capable of effectively recycling glass waste such as glass beverage and food containers comprising glass, paper, plastic, metal, styrofoam and/or resinous materials.

Thus, in response to the above needs, it in an object of the present invention to provide an apparatus and method for recycling glass waste which recovers a higher percentage of glass than is possible with present devices.

It is another object of the present invention to provide an apparatus and method for recycling glass waste which recovers a higher percentage of non-glass materials than is possible with present devices.

It is still another object of the present invention to provide an apparatus and method which effectively recycles laminated safety glass to recover higher percentages of glass and plastic material than is possible with present devices.

It is another object of the present invention to provide an apparatus and method which effectively recycles laminated safety glass by reducing large 4'×6' sections of such glass to a manageable size for recycling.

It is another object of the present invention to provide an apparatus and method which effectively recycles laminated safety glass by reducing such glass having a thickness of 4"–8" to a manageable size for recycling.

It is yet another object of the present invention to provide an apparatus and method for recycling laminated safety glass in a time-efficient manner.

It is a further object of the present invention to provide an apparatus and method for recycling glass which is capable of separating and sizing the recovered glass so that it can be reused.

SUMMARY OF THE INVENTION

In accordance with the present invention, there is provided an improved system and method for recycling laminated glass. The system comprises an interconnected feed means for introducing laminated glass waste into the system, typically a series of conveyor belts and/or vibratory tray feeders, presizer, pulverizer, separator and collector. The feed means also can be either a front end loader, a dump truck, a storage hopper, or any other device capable of holding and depositing a large quantity of glass waste. From the feed means, the glass waste is fed into a sizing station for presizing the glass to produce glass waste strips or squares having dimensions up to 3" wide and 6" to 10" long and preferably still of approximately 2"×6" or less. The sizing station or presizing device may be selected from a shredder, a cutter, a stamper or any similar device capable of transforming glass waste into smaller strips or squares. It is also contemplated that the design of the sizing station could be altered to produce glass waste strips or squares having generally larger or smaller dimensions. In a preferred embodiment, the sizing station is a shredder which comprises a pair of horizontally arrayed, opposed rotating disks. In each set of rotatable disks, a space or gap exists between each disk and its adjacent disk(s). The gap is of a generally predetermined width although it can vary depending on particular recycling needs. Preferably, each rotatable disk also has one or more cutting teeth formed on the outer periphery thereof for grabbing and cutting into the material placed in the shredder. The outer peripheries of the first and second set of rotatable disks overlap one another to form a cutting zone. In operation, the first and second series of rotatable disks rotate in opposite radial directions so that the material, which is fed from above, is pulled down into the shredder and through the cutting zone. The material is then shredded into smaller sections. The disks rotate at a low rate of speed, but have a high torque. Thus, the laminated glass waste does not undergo a high level of impact in the shredder as it is cut into smaller sections. Generally, the laminated glass waste is shredded into strips having approximately two inch by six inch dimensions (2"×6").

After the laminated glass waste has been shredded, it is placed on a conveyor which transfers the shredded laminated glass waste to a storage hopper from where it is then transferred to an impact mill. Once within the impact mill, the shredded laminated glass is pulverized. During pulverization, the glass is impacted with one or more rotatable hammers which throw the glass waste against striker plates. Upon impacting with the striker plates the glass component of the laminated glass waste is beat off the non-glass component of the laminated glass waste to produce a pulverized mixture comprising glass material and non-glass material. Generally, the non-glass material retains the approximate dimensions it had when it entered the impact mill (e.g., the 2"×6" dimension).

The pulverized mixture is then placed onto another conveyor which receives the pulverized mixture and transfers the pulverized mixture to a screening means. The screening means uses a series of sifting screens to separate pieces of glass which are within a predetermined size (i.e., those pieces of glass which fall through the sifting screens to a collection plate), and transfers the separated pieces of glass through a first outlet to a first collection means. The screening means also includes a blowing and suctioning device positioned downstream from the sifting screens for separating non-glass material from the pulverized mixture. The separated non-glass material is then transported through a second outlet to a second collection means.

The system preferably may also include a magnetized area positioned downstream from the screening means for removing metal from the separated glass, the separated non-glass material and/or the pulverized mixture. Oversized glass and non-glass material which remain in the pulverized mixture non-glass material are then transported again to the impact mill for additional pulverization and screening.

The conveyors are preferably vibratory tray feeders constructed of metal. The metal construction of the conveyors prevents the conveyors from being damaged by the shredded glass waste which may have jagged edges that could cut into a conveyor constructed of other materials such as canvas or rubber.

According to one embodiment, the various components of the system are arranged to take advantage of gravitational forces, thereby minimizing the need for conveyors for moving the glass waste. For example, the shredded glass waste is then transferred to vertically configured conveyor having a bucket elevator which transports the waste to the top of the conveyor. The glass waste is then deposited into a hopper which stores the glass waste until it is transferred to impact mill via an automated conveyor. In the impact mill, the glass component of the glass waste is beat off the non-glass component to produce a pulverized mixture which is then transported via another conveyor to two screening devices to separate the glass and the non-glass materials from the pulverized mixture. The embodiment also includes container(s) for collecting the separated glass and the separated non-glass, and may also include a waste container for collecting paper and metal.

The method for recycling glass waste essentially tracks the operations exemplified by the system. The method includes the steps of providing a supply of glass waste, sizing the glass waste to produce presized glass waste, pulverizing the presized glass waste to produce a pulverized mixture comprising glass and non-glass material, separating those pieces of glass which are within a predetermined size from the pulverized mixture and separating those pieces of the non-glass material which are completely free of the glass from the pulverized mixture. In a preferred method, the presizing step comprises shredding the glass waste.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
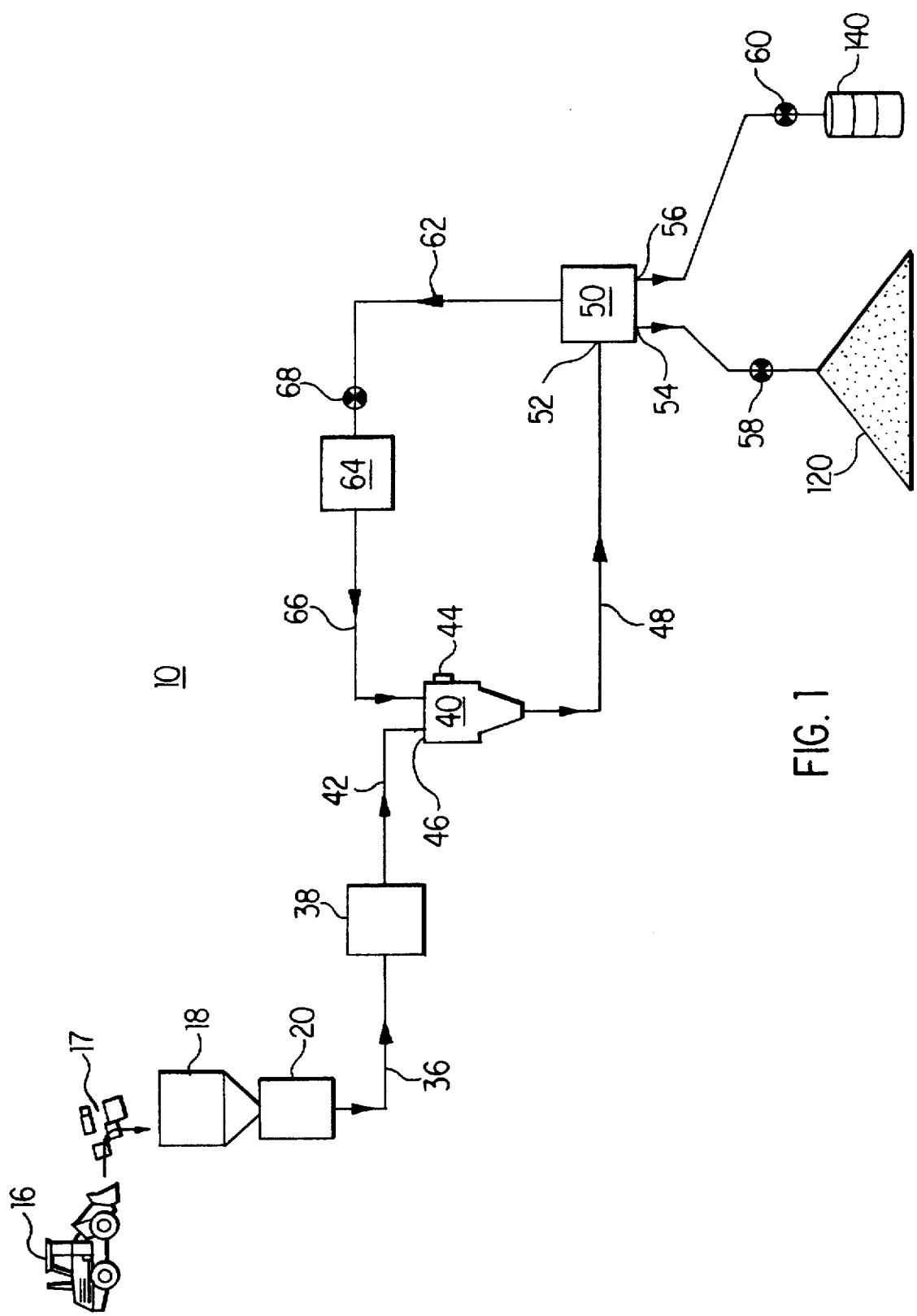
FIG. 1 is a schematic view of one embodiment of an inventive apparatus for recycling glass waste.

Shown generally in FIG. 1 is the system or apparatus 10 as described above for recycling glass waste such as plate glass (e.g., safety glass, laminated glass, wire glass and/or flat glass) and glass containers (e.g., glass bottles, glass jars, drinking glasses) shown generally at 17.

After the glass waste passes through the apparatus 10, the end product includes pure glass 120, which may be further sized according to the dimension of the glass, and non-glass material 140 such as metal, laminate, plastic, paper and/or styrofoam. The glass waste continues to be "recycled" through the system until all of the glass 120 is separated from the glass waste.

As shown in FIG. 1, glass waste 17 is received from a source, such as a front end loader, dump truck or other storage device 16. The glass waste is deposited into a surge hopper 18 which passes the glass waste to a sizing station or presizing device 20 for presizing the glass to produce glass waste strips or squares having dimensions of 2"×6" or less. The sizing station or presizer may be selected from shredders, cutting devices, a stamping devices or any other similar devices capable of transforming glass waste into more or less uniform strips or squares of a predetermined smaller size.

Figure 2:
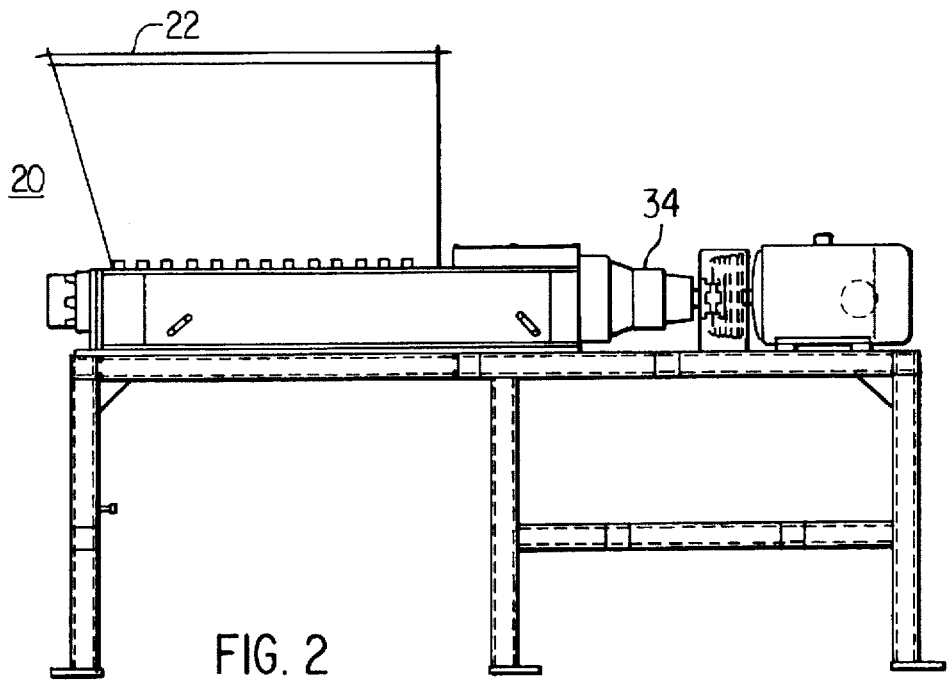
FIG. 2 is a side elevational view of a shredder according to the present invention.
Figure 3:
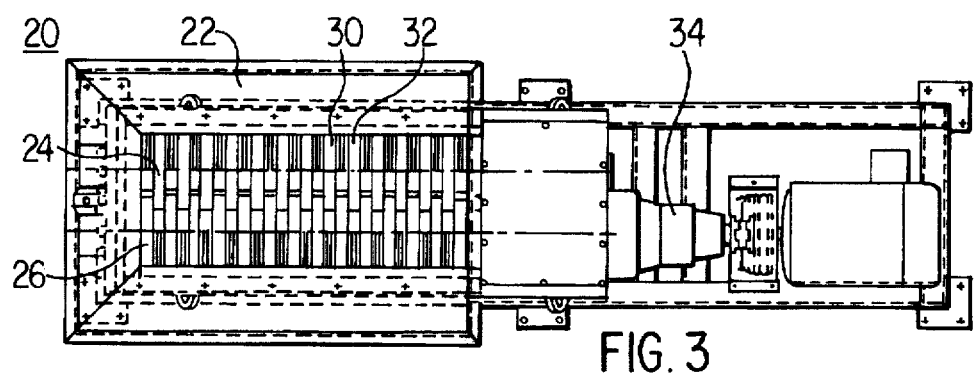
FIG. 3 is a top view of the shredder shown in FIG. 2.
Figure 4:
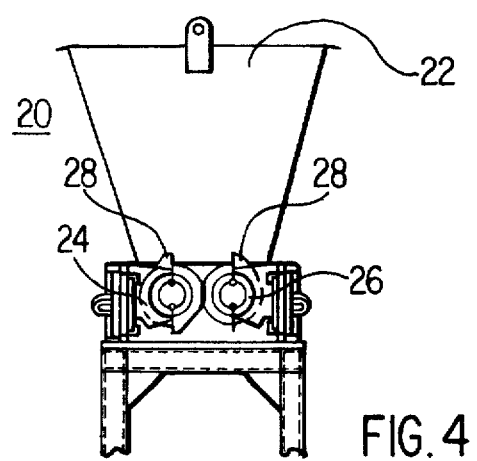
FIG. 4 is an end elevational view of the shredded shown in FIG. 2.

In a preferred embodiment, as shown in FIGS. 2–4, the sizing station is a shredder 20 which includes opening 22 for receiving the glass waste. Preferably, the opening 22 is large enough to receive plate glass having dimensions of four feet by six feet (4'×6') or larger and thicknesses of 4 inches to 8 inches (4" to 8"). Shredder 20 has a first set of rotatable disks 24 which oppose a second set of rotatable disks 26. Each rotatable disk has one or more teeth 28 for cutting into the material to be shredded and pulling the material to be shredded through the shredder. It will be noted that there is a proportional relationship between the number of teeth 28 on each rotatable disk 24, 26 and the size or length of the shredded material, e.g., a disk with eight teeth will shred material into smaller pieces than will a disk with only two teeth. In addition, the size of the shredded material is related to the spacing between laterally adjacent rotatable disks. In one preferred embodiment, the space between laterally adjacent disks 30 and 32 is approximately two inches, although it will be appreciated that this may be adjustable within a range to produce larger or smaller sized pieces.

The preferred shredder 20 is a low speed-high torque shredder which does not shatter the glass waste but merely cuts the glass waste into smaller sections. The shredder 20 also has a counter-rotating, anti-jam drive 34 which reverses the rotation of the rotatable disks 24, 26 when material is lodged in the rotatable disks. The shredder 20 is capable of receiving material as thick as eight (8") inches, although preferably the preferred thickness does not exceed six (6") inches. This feature is particularly advantageous for shredding material such as security glass from a bank which may be considerably thicker than conventional glass. In addition to plate glass, shredder 20 can process glass bottles, glass with wire mesh as well as any other type of glass having paper, plastic, styrofoam and/or metal attached thereto.

One preferred shredder is manufactured by Shredding Systems, Inc., located at 9760 S.W. Freeman Drive, Wilsonville, Oreg. 97070-9286. This shredder is a low speed-high torque shredder which has a counter-rotating, anti-jam drive. The shredder minimizes noise and dust and has a minimum foundation requirement. The shredder opening is adjustable between approximately 20"×15" to 100"× 52". A preferred motor size is between 10 HP–300 horsepower for the electric model and 25 HP–500 HP for the hydraulic model.

Referring to FIG. 1, after the laminated glass waste has been shredded, it is placed on a first conveyor 36 which is positioned to receive the shredded glass waste and transfer the shredded glass waste to a storage hopper 38. The first conveyor 36 is preferably a vibratory tray feeder constructed of metal. The shredded glass waste is stored in the storage hopper 38 until it is transferred to an impact mill 40 via a second conveyor 42. The impact mill 40 includes a control device 44 which controls the movement of the second conveyor 42. The control device 44 is responsive to the amount of shredded glass waste within the impact mill 40. If there is a large quantity of shredded glass waste in the impact mill 40, then the control device 44 will slow down the flow rate of the second conveyor 42 to reduce the flow of shredded glass waste into the impact mill 40. Once the quantity of material in the impact mill 40 is reduced, then the control device 44 will once again speed up the second conveyor 42 to increase the flow of shredded glass waste into the impact mill 40. Specifically, the control device 44 monitors the amount of energy being drawn by the impact mill 40. If the amount of energy being utilized by the mill 40 increases, then the rate of the second conveyor 42 is reduced. If the amount of energy being utilized by the mill 40 decreases, then the rate of the second conveyor 42 will be increased.

Figure 5:
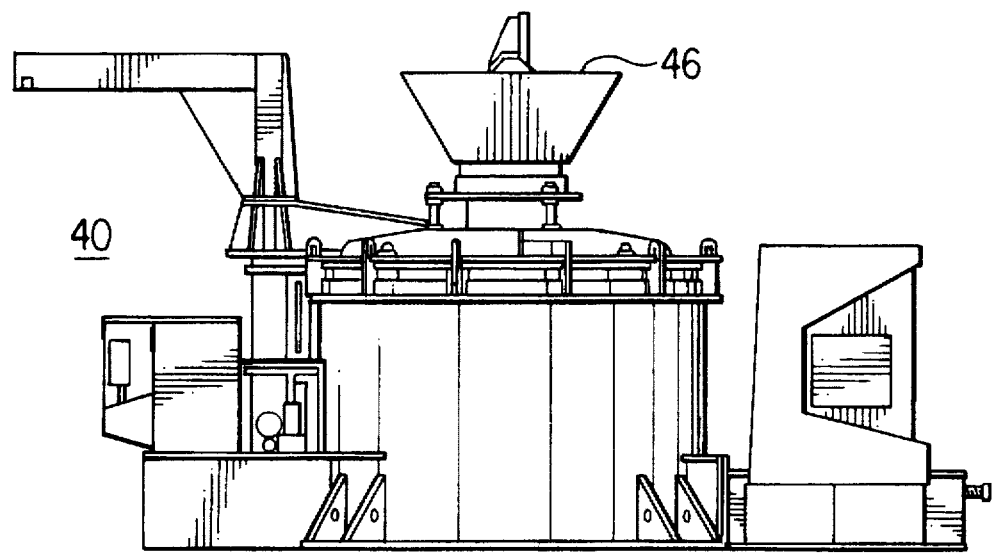
FIG. 5 is a side elevational view of an impact mill according to the present invention.
Figure 6:
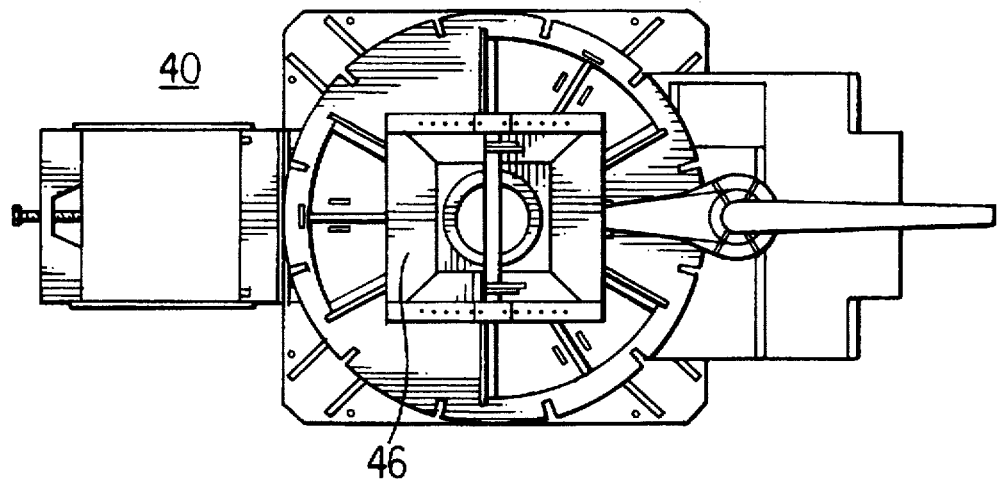
FIG. 6 is a top view of the impact mill shown in FIG. 5.

As shown in FIGS. 1 and 5–6, the impact mill 40 receives the shredded glass waste through an opening 46. The shredded glass is then pulverized by being beat on an internal impact wall to beat the glass off the non-glass material. The impact mill 40 does not break the non-glass material up; it merely breaks the glass and removes it off the non-glass material, via the mechanical beating action. The impact mill generates a pulverized mixture comprising pure glass and non-glass material which could be metal, plastic, laminate, paper, styrofoam, resinous materials or any other material previously secured to glass waste.

After the glass is pulverized, it is deposited on a third conveyor 48 which transports the pulverized mixture to a screening device 50. The screening device 50 comprises a series of vibrating sifting screens which enable the glass to fall through the screens and the non-glass material to remain on the top sifting screen. The screening device 50 has an input 52 for the pulverized mixture and at least two outlets, a first outlet 54 for the separated glass and a second outlet 56 for the separated non-glass material. The glass that is separated is then passed by a series of magnets 58 to remove any metal which is mixed in with the separated glass. The glass can then be passed through a secondary sifter for sifting the glass according to its various sizes.

The screening device 50 also includes a series of air jets and suction hoses for removing the non-glass material from the pulverized mixture. For example, if laminated glass were being recycled, the screening means 50 would first sift out the glass from the pulverized mixture. The plastic material sections would not fall through the sifting screens but would remain on the top sifting screen. The plastic material would then be subjected to the air jets and vacuum hoses to collect the plastic material. The airjets and vacuum hoses can also collect the lighter foreign materials such as paper, plastic,
metal, styrofoam and/or wood which are typically present in glass waste. The non-glass material 140 is also passed by a series of magnets 60 before it is collected in a container 140 for reuse.

The pieces of glass which are not within a predetermined size, either because they were too large to fall through the sifting screens or because they were still adhered to the non-glass material, will be returned to the impact mill 40 via a fourth conveyor 62 for further pulverization and screening. The fourth conveyor 62 transports the oversized matter to a second storage hopper 64 where it is held until it is transported to the impact mill 40 via a fifth conveyor 66. The apparatus may also be designed so the oversized matter is transported back to the first storage hopper 38 before it is sent to the impact mill 40. While being transferred back to the impact mill 40 for additional pulverization, the oversized matter is passed by a series of magnets 68 to remove any metal objects which are in the oversized matter.

The non-glass material that is collected can be subjected to further milling for further reduction in size. The additional milling reduces the size of the non-glass material based on the customer's needs. As discussed above, on the way to its final collection point 140, the non-glass material passes a series of magnets 60 which remove any metallic objects which are mixed in with the non-glass material. Preferably, the conveyors are constructed of metal in order to prevent the conveyors from being damaged by the glass waste which could occur if they were constructed of another material such as rubber or canvas.

Figure 7:
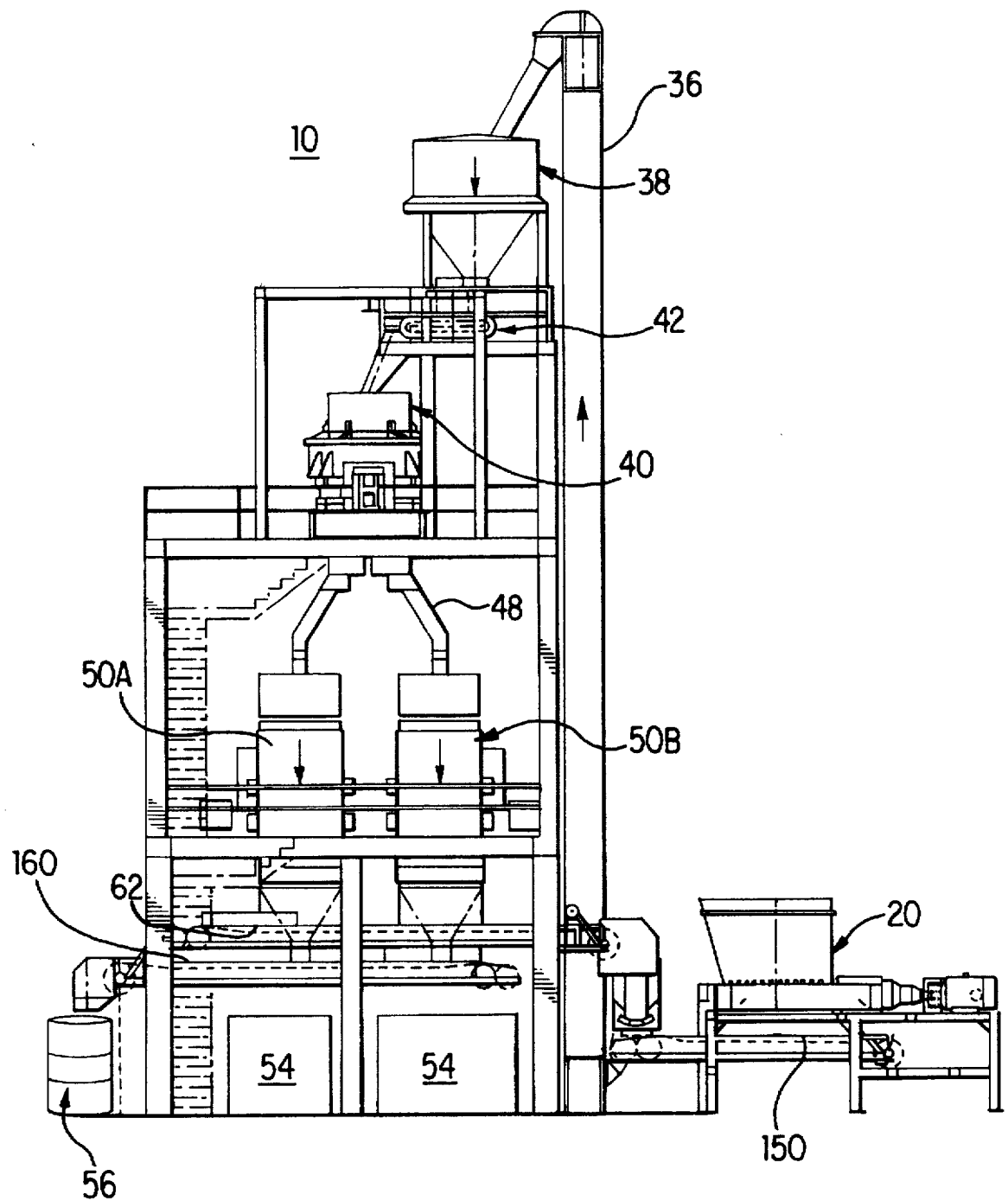
FIG. 7 is one embodiment of the apparatus shown in FIG. 1.

FIG. 7 shows one embodiment of the apparatus 10 shown in FIG. 1, wherein the various components are arranged in a manner which takes advantage of gravitational forces, thereby minimizing the need for conveyor belts or additional moving equipment for transporting the glass waste through the apparatus 10. In the embodiment, the glass waste is placed in shredder 20 and processed to produce shredded glass waste. The shredded glass waste is then transferred by horizontal conveyor 150 to vertically configured bucket elevator 36 which transports the waste to the top. The glass waste is then deposited into a hopper 38 which stores the glass waste until it is transferred to impact mill 40 via automated conveyor or chute 42. In the impact mill 40, the glass component 12 of the glass waste is beat off the non-glass component 14 to produce a pulverized mixture which is then transported via conveyor 48 to screening device 50 which screens the pulverized material for separating the glass and the non-glass materials. One preferred embodiment uses two screening devices 50A and 50B, thereby increasing the volume of glass waste which may be processed at any one time. The embodiment includes container(s) 54 for collecting the glass 120 and the non-glass 140 which has been screened and separated, and conveyor 160 for transporting waste which does not comprise the separated glass 120 and non-glass material 140, such as paper and metal, to an additional storage container 56. Conveyor 62 transports oversized matter which has not been separated from the pulverized mixture back to the bucket elevator 36 for being returned to the impact mill 40 for additional pulverization and screening.

As discussed above, the embodiment shown in FIG. 7 minimizes the need for moving equipment for transporting the glass waste, such as additional conveyor belts, because the waste is transported to a high point thereby enabling the apparatus to take advantage of gravitational forces as the glass waste is moved downward. The embodiment is approximately thirty-five to forty feet (35–40') in height; however, the apparatus can be modified for use in a smaller building by reducing the size of bucket elevator 36 and using one or more additional vertical conveyors downstream of bucket elevator 36.

The present invention also includes a method for recycling glass to recover pure glass and non-glass material for reuse. The preferred method includes the steps of providing a supply of glass waste and presizing the glass waste to produce presized glass waste having the dimensions of 2"×6" or less. A preferred method for presizing the glass waste includes the step of shredding the glass waste. As previously mentioned, the exact dimension of the presized glass waste can be controlled based on the specific design of the presizing device. The presized glass waste is then pulverized to produce a pulverized mixture comprising glass and non-glass material. Those pieces of glass having a predetermined size are then separated from the pulverized mixture and those pieces of non-glass material which are completely separated from the glass are separated from the pulverized mixture by blowing and suctioning the non-glass material. The method also includes the steps of passing the separated glass and the separated non-glass material by a series of magnets for recovering any metal objects therefrom, and collecting the separated glass and non-glass material in respective containers for reuse. The collected glass may be further sifted by size.

While particular embodiments of the present invention have been illustrated and described herein, it is not intended to limit the invention and changes and modifications may be made therein within the scope of the following claims.

What is claimed is:

1. An apparatus for recycling glass waste comprising:
    sizing station for producing presized glass waste;
    conveyor means for transferring said presized glass waste to an impact mill;
    impact mill for pulverizing said presized glass waste for producing a pulverized mixture comprising glass and non-glass material; and
    screening means for receiving said pulverized mixture, wherein said screening means separates said glass from said non-glass material.

2. The apparatus of claim 1, wherein said sizing station is selected from the group consisting of shredders, cutters and stampers.

3. The apparatus of claim 2, wherein said screening means comprises:
    a first series of sifting screens for separating said glass from said pulverized mixture; and
    air jet and vacuum station for separating said non-glass material in said pulverized mixture.

4. The apparatus of claim 3 further comprising magnetic means downstream from said air jet and vacuum station for recovering non-glass material comprising metal.

5. The apparatus of claim 3 further comprising a second series of sifting screens downstream from said first series of sifting screens for separating said glass by size.

6. The apparatus of claim 5, further comprising means for returning pieces of said glass and said non-glass material which have not been separated from said pulverized mixture to said impact mill for additional pulverization and screening.

7. The apparatus of claim 2, wherein said conveyor means comprises vibratory tray feeders.

8. The apparatus of claim 2, wherein said impact mill comprises means for controlling the rate of movement of said conveyor means for regulating the flow of said presized glass waste into said impact mill.

9. The apparatus of claim 8, wherein said control means comprises means for recording the quantity of said glass waste which passes through said apparatus.

10. The apparatus of claim 2, wherein said glass waste is selected from the group consisting of plate glass, laminated glass, wire glass, safety glass, and glass containers.

11. The apparatus of claim 10, wherein said laminated glass is a windshield for a motorized vehicle.

12. The apparatus of claim 10, wherein said non-glass material is a selected one from the group consisting of laminate, metal, wire mesh, paper and plastic.

13. The apparatus of claim 10, wherein said presizing means is a shredding device comprising:
    a surge hopper for receiving said glass waste; and
    a plurality of rotatable disks, wherein each disk comprises at least one cutting tooth for shredding said glass waste.

14. An apparatus for recycling glass waste comprising:
    sizing station for producing presized glass waste;
    first conveyor means positioned for receiving said presized glass waste and transferring said presized glass waste to a storage hopper;
    storage hopper positioned adjacent said first conveyor means in operating relationship for receiving said presized glass waste from said first conveyor means and storing said presized glass waste;
    second conveyor means positioned for receiving said stored presized glass waste and transferring said stored presized glass waste to an impact mill;
    impact mill positioned adjacent said second conveyor means in operating relationship for receiving said presized glass waste from said first conveyor means and pulverizing said presized glass waste for producing a pulverized mixture comprising glass and non-glass material;
    third conveyor means positioned for receiving said pulverized mixture from said impact mill and transferring said pulverized mixture to a screening means; and
    screening means positioned adjacent said third conveyor means in operating relationship for receiving said pulverized mixture from said third conveyor means, wherein said screening means separates pieces of said glass which are within a predetermined size and transfers said separated pieces of glass to a collection means, and said screening means separates those pieces of said non-glass material which are completely free of said glass and transfers said separated non-glass material to said collection means.

15. A method for recycling glass waste comprising the steps of:
    providing a supply of glass waste;
    presizing said glass waste to produce presized glass waste;
    pulverizing said presized glass waste in an impact mill to produce a pulverized mixture comprising glass and non-glass material; and
    separating pieces of said glass from said non-glass material.

16. The method of claim 15 further comprising the step of separating those pieces of said non-glass material which are completely free of said glass from said pulverized mixture.

17. The method of claim 15, wherein said presizing step comprises the step of shredding said glass waste.

18. The method of claim 15, further comprising the step of:
    returning those pieces of said glass and said non-glass material which have not been separated from said pulverized mixture to said impact mill for additional pulverization.

19. The method of claim 15, wherein said separating said non-glass material step comprises blowing and suctioning said non-glass material from said pulverized mixture.

20. The method of claim 15, further comprising the step of:

passing said separated glass by a series of magnets for recovering metal from said separated glass.

21. An apparatus for recovering internal laminate from laminated glass waste comprising:

cutting station comprising a surge hopper for receiving laminated glass waste; and a plurality of rotatable disks, wherein each disk comprises at least one cutting tooth for producing cut waste;

conveyor for transferring cut waste to an impact mill;

impact mill for said cut waste for producing a pulverized admixture comprising glass particles and laminate material;

screening means for receiving said pulverized admixture, wherein said screening means separates said glass particles from said laminate material; and first storage zone for receiving said glass particles and a second storage zone for receiving said laminate material.

22. The apparatus of claim 21, wherein said screening means comprises:

air jet and vacuum station for separating laminate material from said pulverized admixture; and a first series of sifting screens for separating said glass from said pulverized mixture.

23. The apparatus of claim 21 further comprising magnetic means for recovering non-glass material comprising metal.

24. The apparatus of claim 23, further comprising means for returning pieces of said cut waste, said glass and said laminate material which have not been separated from said pulverized admixture to said impact mill for additional pulverization.

25. The apparatus of claim 24, further comprising airjet and vacuum station and at least one series of sifting screens for separating said laminate and glass particles from said pulverized admixture.

26. The apparatus of claim 24, wherein said impact mill comprises means for controlling the rate of movement of said conveyor means for regulating the flow of said cut waste into said impact mill.

27. An apparatus for separating non-glass material from glass waste comprising:

sizing station for producing presized glass waste;

first conveyor for receiving and transferring said presized glass waste to a storage hopper;

storage hopper adjacent said first conveyor in operating relationship for receiving and storing said presized glass waste;

second conveyor in operating relationship for receiving and transferring said stored presized glass waste to an impact mill;

impact mill adjacent and in operating relationship with said second conveyor for receiving and pulverizing said presized glass waste for producing a pulverized mixture comprising glass and non-glass material;

third conveyor for receiving and transferring said pulverized mixture to a screening means; and screening means comprising at least one vibratory tray screens adjacent said third conveyor and in operating relationship thereto for receiving said pulverized mixture from said third conveyor means, wherein said screening means separates pieces of said glass which are within a predetermined size and transfers said separated pieces of glass to a first collection zone, and said screening means separates those pieces of said non-glass material which are completely free of said glass and transfers said separated non-glass material to a second collection zone.

* * * * *